Dec. 22, 1953          J. D. GARDNER          2,663,086
CALIPER FOR THREADED JOINTS
Filed April 14, 1952          2 Sheets—Sheet 1
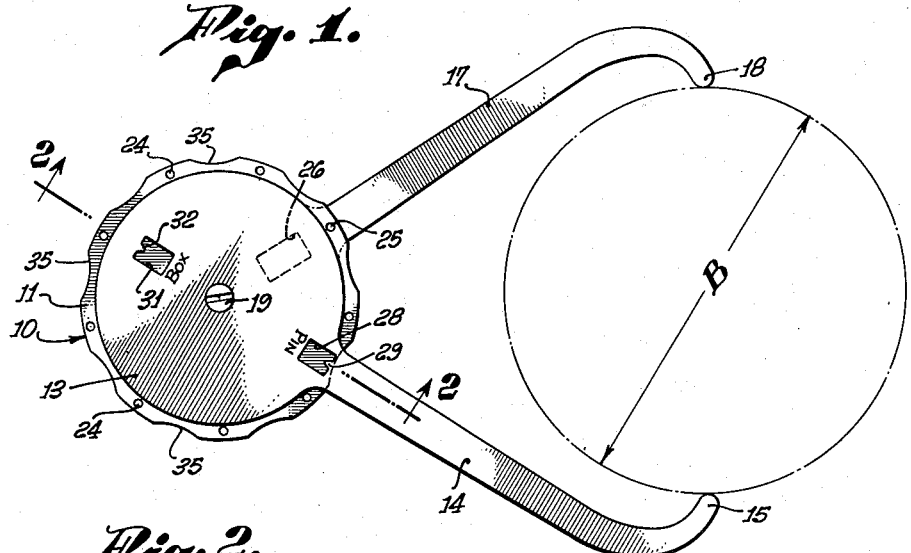
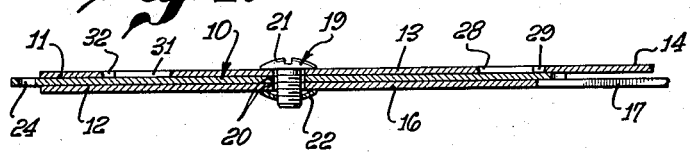
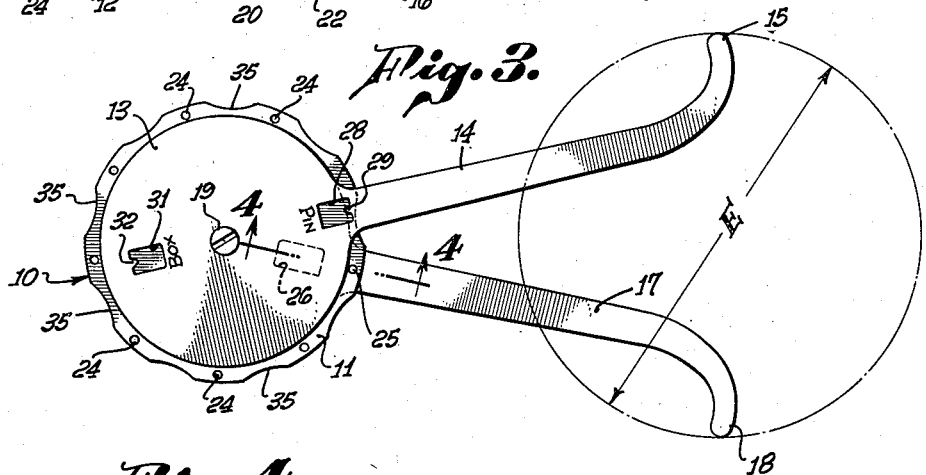
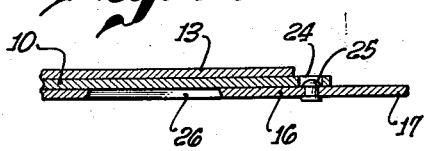
JAMES D. GARDNER,
INVENTOR.
BY
Bernard Kriegel
ATTORNEY.

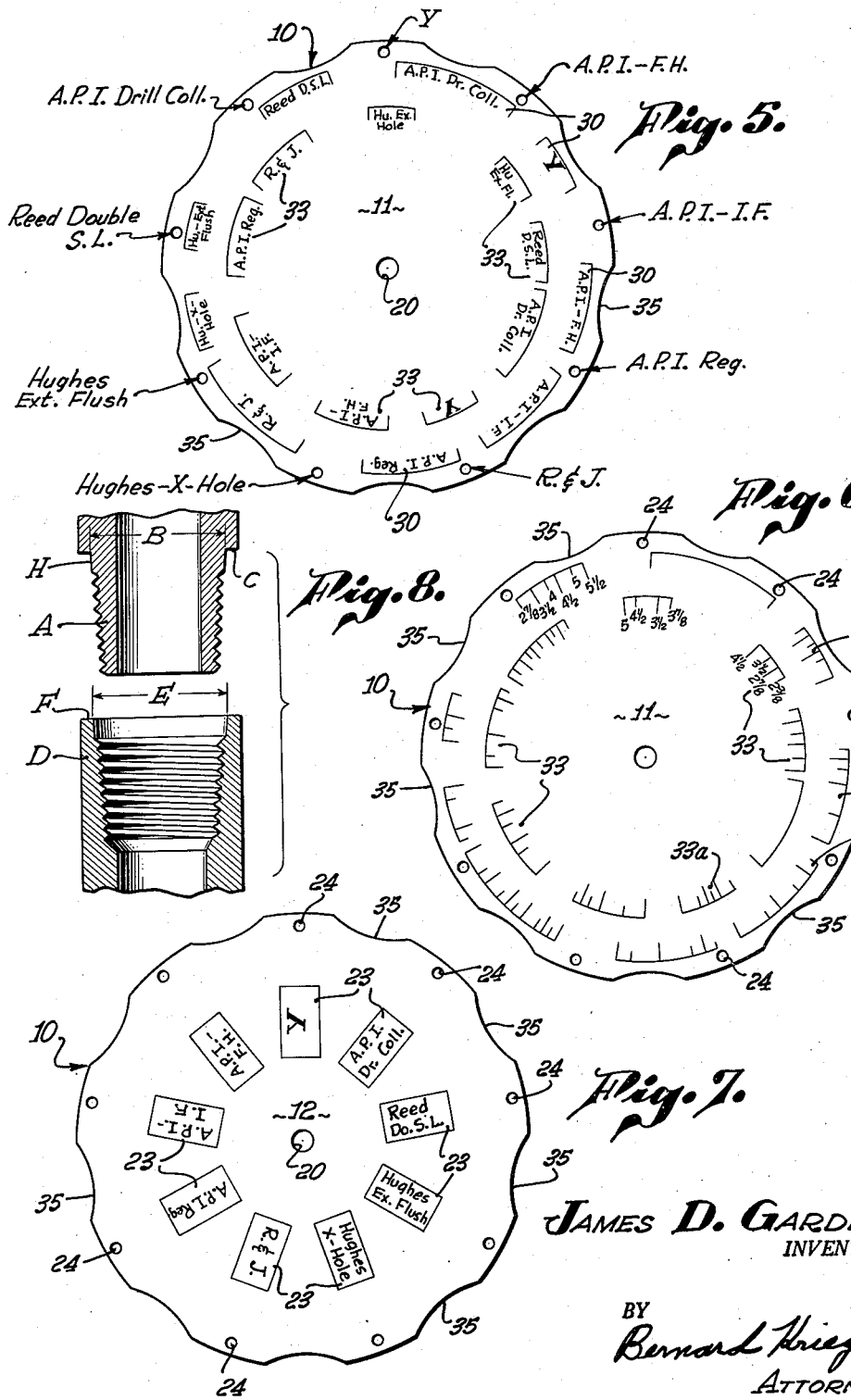

Patented Dec. 22, 1953

2,663,086

UNITED STATES PATENT OFFICE 2,663,086

CALIPER FOR THREADED JOINTS

James D. Gardner, Houston, Tex., assignor to Baash-Ross Tool Company, Los Angeles, Calif., a company of California Application April 14, 1952, Serial No. 282,210

10 Claims. (Cl. 33—148)

The present invention relates to measuring devices, and more particularly to calipers for determining the sizes of threaded joints, such as tool joints used in oil, gas and similar well bores.

An object of the present invention is to provide an improved caliper that enables the size of a threaded joint, such as a tool joint, to be determined readily.

Another object of the invention is to provide a caliper than can be set in various selected positions for different types of tool joints, and which gives a direct determination of the size of each tool joint for which it may have been preset.

A further object of the invention is to provide a caliper capable of use in directly ascertaining the size of both the pin and box portions of a threaded joint, such as a tool joint used in well bores.

Yet another object of the invention is to provide a caliper capable of being preset for different types of tool joints, and of furnishing a direct reading of the size of the pin and box ends of each type of joint.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

Figure 1 is a plan view of a caliper embodying the invention, with its parts in position for measuring the outside diameter of a member;

Fig. 2 is an enlarged cross-section taken along the line 2—2 on Fig. 1;

Fig. 3 is a view similar to Fig. 1, disclosing the use of the caliper in measuring an inside diameter;

Fig. 4 is an enlarged section taken along the line 4—4 on Fig. 3;

Fig. 5 is an enlarged plan view of the indicator portion of a dial for giving the sizes of the different types of tool joints;

Fig. 6 is the same view as Fig. 5, but setting forth the different graduations contained in the different portions of the indicator dial face shown in Fig. 5;

Fig. 7 is a plan view of the reverse side of the dial disclosed in Figs. 5 and 6;

Fig. 8 is an exploded view of the pin and box portions of a typical tool joint.

The caliper disclosed in the drawings has been particularly designed for determining the sizes of different types of tool joints. It can be preset for a known kind of joint, and, by measuring either a portion of the pin or the box of the joint, its size is directly indicated on the caliper.

The specific caliper illustrated will give a direct indication of the size of the pin portion A of the joint by measuring the outside diameter B of the joint at the base C of the pin. The caliper can also give the size of the box portion D of the joint by measuring the inside diameter E of the counterbore in the box at its shoulder or outer end portion F.

The caliper includes a central or intermediate dial 10 having a front indicator face 11 and a rear reference face 12. Disposed on the front or indicator face 11 is an indicator disc 13, from which an indicator arm 14 extends that terminates in a finger 15 adapted to engage the pin or box portions A, D of the tool joint. Disposed adjacent the reference face 12 of the dial is a reference disc 16 that has a reference arm 17 extending therefrom and terminating in a finger 18, which is also adapted to engage the pin or box portions, A, D of the joints.

The reference disc 16 and arm 17 can be moved arcuately with respect to the dial 10 to various selective positions, and can be locked in such selected positions. Similarly, the indicator disc 13 and its arm 14 can be moved arcuately with respect to the dial 10 and the reference disc and its arm, in a manner described below. To enable such pivotal or relative arcuate movements to occur, a bolt 19 extends through central aligned holes 20 in the dial 10 and discs 13, 16, the bolt having a head 21 engaging one of the discs, such as the indicator disc 13, there being a nut 22 threaded on the bolt and engaging the outer surface of the other disc 16, in order to hold the discs and dial in appropriate assembled relation with respect to each other.

As disclosed most clearly in Fig. 7, the back face 12 of the dial has a series of indications 23 thereon, which may be uniformly spaced around its axis, and which are indicative of the type of joint which is to be measured. As shown in Fig. 7, by way of example, these indications may represent the following types of tool joints: Y (any selected type), API Drill Collar, Reed Double Streamline, Hughes External Flush, Hughes Xtra Hole, R & J (Baash-Ross), API Regular, API Internal Flush, and API Full Hole. Of course, the API joints conform to the standards of the American Petroleum Institute, whereas the Baash-Ross, Reed and Hughes types of tool joints are those specifically designed and manufactured by the Baash-Ross Tool Company, Reed Roller Bit Company and the Hughes Tool Company.

The indications of the types of joints are preferably disposed on lines radiating from the axis of the dial, and disposed on such radial lines at the outer margins of the dial 10 are holes 24 adapted to receive a detent in the form of a rivet 25 secured to the reference disc 16 (Fig. 4). This latter disc is provided with a reference window or opening 26 that can coincide selectively with the reference indications 23 on the dial 10 indicative of the type of tool joint. When such reference window or opening 26 is disposed over a particular type of tool joint, the reference disc detent 25 will be received in the hole 24 in radial alignment with such type of joint, in order to releasably couple the reference disc 16 and its reference arm 17 to the dial 10.

After the reference disc 16 has been appropriately shifted to dispose its window 26 and detent 25 in proper relation to the type of tool joint 23, the indicator disc 13 and its arm 14 can be moved about the axis of the bolt 19, and the fingers 15, 18 on the arms 14, 17 placed on the pin or box portions of the particular tool joint, to provide a direct reading of the size of the tool joint. The indicator disc 13 has an opennig 28, and a pointer 29 at its outermost portion extending into this opening, which is cooperable with a series of graduations or indicia 30 disposed on the outer portion of the front or indicating face 11 of the dial 10, to afford a direct reading of the outside diameter B of the pin A at its base C. The indicator disc 13 is also provided with another window or opening 31, into which an indicator pointer 32 extends, this latter opening and pointer being disposed radially inward of the other opening 28 and pointer 29, for cooperation with a different circularly arranged series of graduations or indicia 33 that will enable a direct reading of the inside diameter E of the box portion D of the joint to be made.

The particular indications or graduations 30, 33 of the pin and box diameters for the different types of tool joints are disclosed in both Figs. 5 and 6, for purposes of clarity and explanation, although it is to be understood that in the actual caliper it will only be necessary for the graduations shown in Fig. 6 to be used. Fig. 5 is representative to the types of tool joints for which the particular sets of graduations apply. Thus, to determine the size of the pin A of the tool joint, the outer circumferentially arranged series of graduations 30 are disposed in appropriate positions on the front face 11 of the indicator dial 10, to indicate, reading in a clockwise direction in Fig. 5, the sizes of an API Drill Collar, Y Tool Joint, API Full Hole Joint, API Internal Flush Joint, API Regular Joint, R & J Joint, Hughes Xtra Hole Joint, Huges External Flush Joint and Reed Double Streamline Joint. The series of box indications 33 are arranged on the same circle disposed inwardly of the pin indications 30, starting from the API Drill Collar and continuing sequentially through the same types of joints that were mentioned above in connection with the pin end. The box indications 33 are angularly displaced with respect to the corresponding pin graduations 30, in view of the different relative positions occupied by the indicator and reference discs 13, 16 and their respective arms 14, 17 when measuring inside diameters instead of outside diameters.

Each type of tool joint has two sets of indications along an arcuate extent of the indicator face 11 of the dial 10. Thus, the type of joint Y has a series of graduations or indications 30a for its pin portion, and also a series of indications 33a for its box portion.

In the use of the caliper, it is necessary to know the type of tool joint. Assuming the tool joint to be of the Y type, the reference disc 16 is deflected outwardly of the dial 10 to a slight extent, to remove the detent 25 from the dial hole 24 in which it may have been previously positioned, and the reference disc 16 and its arm 17 are moved with respect to the dial until the reference window 26 is disposed in alignment with the Y indications 23 on the reference face 12 of the dial. The disc may be released to allow the detent 25 to enter the hole 24 corresponding to the Y reference indication. In this manner, the caliper has been preselected for determining the size of a Y joint for both the pin end and the box end.

Assuming the size of the pin end A of the joint is to be determined, the finger 18 of the reference arm 17 is placed on the shoulder H of the pin at the base C of the pin and the indicator disc 13 and arm 14 shifted until the indicator finger 15 is disposed diametrically opposite the reference finger 18 at the base C of the pin. The pin pointer 29 will then be disposed opposite the particular graduation 30a on the Y scale portion of the dial 10, to give a direct reading of the size of the pin, such reading being obtainable by viewing the dial face 11 through the pin window or opening 28 of the indicator disc 13. Such use of the caliper is illustrated in Fig. 1.

If it is desired to determine the size of the box portion D of the Y tool joint, then the caliper arms 14, 17 are reversed to make a measurement of an inside diameter, such as illustrated in Fig. 3. The caliper is inserted within the counterbore E of the box D and the end of the reference arm finger 18 disposed in the counterbore at its outer end or shoulder F. The indicator disc 13 and arm 14 are then appropriately shifted outwardly until the end of the indicator finger 15 engages the corresponding diametrically opposite portion of the counterbore E at the shoulder F. The box pointer 32 will then be disposed at the appropriate graduation of the Y box scale 33a, to give a direct reading or indication of the size of the box, the box opening 31 in the indicator disc 13 enabling such scale to be viewed.

In a similar fashion, any of the other types of tool joints can be measured, both their pin and their box ends, by appropriate shifting of the reference disc 16, to place its window 26 in alignment with the particular type of tool joint 23 indicated on the reference face 12 of the dial 10, and its detent 25 in the corresponding hole 24. The indicator disc 13 and its arm 14 can be appropriately manipulated to measure either the pin portion of the joint, or the box portion, in the manner specifically described above in connection with a Y joint.

In order to facilitate the shifting of the reference disc 16 and its arm 17 with respect to the dial 10, the latter may have serrations or indentations 35 on its periphery between the detent holes 24, to enable firmer grasping of the dial 10 by the hand of the user.

The windows 28, 31 in the indicator disc 13 and the pointers 29, 32 are disposed outwardly of the indicator disc to as great an extent as possible, to enable the corresponding graduations 30, 33 on the indicator face 11 of the dial 10 to be disposed as far apart as possible, since such graduations can then be provided on circles of greater radii. Although the box and pin pointers 29, 32 on the indicator disc are disposed diametrically opposite one another, it is evident that they can be otherwise displaced from one another. Of course, it would then be necessary to appropriately dispose the different graduations 30, 33 for each type of joint on the indicator face of the dial. For that matter, the graduations 33 indicative of the size of a particular tool joint box are arcuately displaced from the corresponding graduations 30 of that type of joint representative of its pin end, and such displacement is not equal to the displacement of the box and pin pointers 29, 32 from one another, in view of the necessity for reversing the indicator and reference arms 14, 17 with respect to each other, in the event the internal diameter of a joint box is to be determined, rather than the outside diameter of a joint pin.

It is, accordingly, apparent that a caliper has been devised that enables the sizes of different types of joints to be determined very rapidly and accurately. It is merely necessary to know the type of the joint and set the reference disc 16 in its appropriate position with respect to the dial 10, the disc 16 being retained in this position by the detent 25. Thereafter, the caliper is used in a normal manner and a direct reading of the size of the pin or box determined.

The inventor claims:

1. A caliper for measuring threaded joints, comprising a main member, a reference member adjacent said main member and adjustable with respect thereto, one of said members having reference indications cooperable with said other member and representative of different type of joints, an indicator member adjacent said main member and adjustable with respect thereto, said main member and indicator member having cooperable indicating means thereon determining the sizes of different joints, said reference member and indicator member having means thereon engageable with a portion of a joint to locate said indicator member with respect to said main member and indicating means, and coengaging detent means on said main member and reference member releasably coupling said main member and reference member together in various relative positions.

2. A caliper for measuring threaded joints, comprising a main member having reference indications thereon representative of different types of joints, said member having size indications thereon of different sizes of said joints, a reference member adjacent said main member and adjustable with respect thereto to dispose said reference member selectively with respect to said reference indications, an indicator member adjacent said main member adjustable with respect thereto and cooperable with said size indications to determine the sizes of different types of joints, said reference member and indicator member having means thereon engageable with a portion of a joint to locate said indicator member with respect to the size indications of said main member, and coengaging detent means on said main member and reference member releasably coupling said main member and reference member together in various relative positions.

3. A caliper for measuring threaded joints, comprising a dial having reference indications on one face thereof representing different types of joints, the other face of said dial having size indications of different sizes of joints, a reference disc adjacent said one face and having an opening through which said reference indications can be observed, an indicator disc adjacent said other face and having an opening through which said size indications can be observed, means mounting said dial and discs for pivotal movement with respect to each other to enable said discs to be adjusted with respect to each other and said dial, in order that said reference disc can be shifted between reference indications and said indicator disc shifted with respect to said size indications, said discs having means thereon engageable with a portion of a joint to locate said indicator disc with respect to said size indications.

4. A caliper for measuring threaded joints, comprising a dial having circumferentially spaced reference indications on one face thereof representing different types of joints, the other face of said dial having circumferentially spaced groups of size indications of said types of joints, a reference disc adjacent said one face and having an opening selectively disposable over said reference indications upon relative rotation between said dial and disc, an indicator disc adjacent said other face and having an opening selectively disposable over said spaced groups of size indications upon relative rotation between said dial and indicator disc, means mounting said dial and discs for relative rotation about a common axis, said discs having means thereon engageable with a portion of a joint to locate said indicator disc with respect to said size indications.

5. A caliper for measuring threaded joints, comprising a dial having circumferentially spaced reference indications on one face thereof representing different types of joints, the other face of said dial having circumferentially spaced groups of size indications of said types of joints, a reference disc adjacent said one face and having an opening selectively disposable over said reference indications upon relative rotation between said dial and disc, detent means on said dial and disc releasably coupling said disc to said dial in such selected positions, an indicator disc adjacent said other face and having an opening selectively disposable over said spaced groups of size indications upon relative rotation between said dial and indicator disc, means mounting said dial and discs for relative rotation about a common axis, said discs having means thereon engageable with a portion of a joint to locate said indicator disc with respect to said size indications.

6. A caliper for measuring threaded joints, comprising a dial having circumferentially spaced reference indications on one face thereof representing different types of joints, the other face of said dial having circumferentially spaced groups of external diameter size indications of said types of joints and also circumferentially spaced groups of internal diameter size indications of said types of joints, a reference disc adjacent said one face and having an opening selectively disposable over said reference indications upon relative rotation between said dial and disc, an indicator disc adjacent said other face and having an opening selectively disposable over said external diameter size indications and another opening selectively disposable over said internal diameter size indications upon relative rotation between said dial and indicator disc, means mounting said dial and discs for relative rotation about a common axis, said discs having means thereon engageable with a portion of a joint to locate said openings of said indicator disc with respect to said groups of internal and external diameter size indications.

7. A caliper for measuring threaded joints, comprising a dial having circumferentially spaced reference indications on one face thereof representing different types of joints, the other face of said dial having circumferentially spaced groups of external diameter size indications of said types of joints and also circumferentially spaced groups of internal diameter size indications of said types of joints, a reference disc adjacent said one face and having an opening selectively disposable over said reference indications upon relative rotation between said dial and disc, detent means on said dial and disc releasably coupling said disc to said dial in such selective positions, an inicator disc adjacent said other face and having an opening selectively disposable over said external diameter size indications and another opening selectively disposable over said internal diameter size indications upon relative rotation between said dial and indicator disc, means mounting said dial and discs for relative rotation about a common axis, said discs having means thereon engageable with a portion of a joint to locate said openings of said indicator disc with respect to said groups of internal and external diameter size indications.

8. A caliper for measuring threaded joints, comprising a dial having circumferentially spaced reference indications on one face thereof representing different types of joints, the other face of said dial having circumferentially spaced groups of external diameter size indications of said types of joints and also circumferentially spaced groups of internal diameter size indications of said types of joints, a reference disc adjacent said one face and having an opening selectively disposable over said reference indications upon relative rotation between said dial and disc, said dial having holes therein in substantial radial alignment with said reference indication, a detent on said reference disc disposable in said holes to releasably couple said dial and reference disc together, an indicator disc adjacent said other face and having an opening selectively disposable over said external diameter size indications and another opening selectively disposable over said internal diameter size indications upon relative rotation between said dial and indicator disc, means mounting said dial and indicator disc, means mounting said dial and discs for relative rotation about a common axis, said discs having means thereon engageable with a portion of a joint to locate said openings of said indicator disc with respect to said groups of internal and external diameter size indications.

9. A caliper for measuring threaded joints, comprising a dial having circumferentially spaced reference indications on one face thereof representing different types of joints, the other face of said dial having circumferentially spaced groups of external diameter size indications of said types of joints and also circumferentially spaced groups of internal diameter size indications of said types of joints, a reference disc adjacent said one face and having an opening selectively disposable over said reference indications upon relative rotation between said dial and disc, said dial having holes therein in substantial radial alignment with said reference indications, a detent on said reference disc disposable in said holes to releasably couple said dial and reference disc together, an indicator disc adjacent said other face and having an opening selectively disposable over said external diameter size indications and another opening selectively disposable over said internal diameter size indications upon relative rotation between said dial and indicator disc, said indicator disc having an indicator at each of said openings alignable with said external and internal diameter size indications, means mounting said dial and discs for relative rotation about a common axis, said discs having means thereon engageable with a portion of a joint to locate said indicators of said indicator disc with respect to said external and internal diameter size indications.

10. A caliper for measuring threaded joints, comprising a dial having circumferentially spaced reference indications on one face thereof representing different types of joints, the other face of said dial having circumferentially spaced groups of external diameter size indications of said types of joints and also circumferentially spaced groups of internal diameter size indications of said types of joints, said groups of external diameter size indications being disposed from the axis of the dial a different radial distance than said group of internal diameter size indications, a reference disc adjacent said one face and having an opening selectively disposable over said reference indications upon relative rotation between said dial and disc, an indicator disc adjacent said other face and having an opening selectively disposable over said external diameter size indications and another opening selectively disposable over said internal diameter size indications upon relative rotation between said dial and indicator disc, means mounting said dial and discs for relative rotation about a common axis, said discs having means thereon engageable with a portion of a joint to locate said openings of said indicator disc with respect to said groups of internal and external diameter size indications.

JAMES D. GARDNER.

References Cited in the file of this patent

UNITED STATES PATENTS

| Number | Name | Date |
|---|---|---|
| 1,285,175 | Hinkle | Nov. 19, 1918 |
| 2,246,002 | Powers | June 17, 1931 |

FOREIGN PATENTS

| Number | Country | Date |
|---|---|---|
| 596,543 | England | Jan. 16, 1948 |